United States Patent [19]
Sorley et al.

[11] Patent Number: 5,792,350
[45] Date of Patent: Aug. 11, 1998

[54] OIL SPILL RECOVERY VESSEL

[75] Inventors: Graeme Sorley; Malcolm Brown, both of Victoria, Canada

[73] Assignee: OSR Systems Ltd., Victoria, Canada

[21] Appl. No.: 663,815

[22] Filed: Jun. 14, 1996

[51] Int. Cl.⁶ .................................................. E02B 15/04
[52] U.S. Cl. ........................................ 210/242.3; 210/923
[58] Field of Search .............................. 210/122, 242.1, 210/242.3, 771, 923

[56] References Cited

U.S. PATENT DOCUMENTS

| | | | |
|---|---|---|---|
| 3,737,040 | 6/1973 | Brydoy et al. | 210/242.3 |
| 4,165,282 | 8/1979 | Bennett et al. | 210/242.3 |
| 4,426,288 | 1/1984 | Müte | 210/923 |
| 4,514,299 | 4/1985 | Ayroldi | 210/242.3 |
| 4,978,448 | 12/1990 | Terokomos | 210/242.3 |
| 5,043,065 | 8/1991 | Propp | 210/242.3 |
| 5,051,181 | 9/1991 | Sandkvist | 210/242.3 |
| 5,194,164 | 3/1993 | Adams | 210/923 |

FOREIGN PATENT DOCUMENTS 1063039  9/1979  Canada.

*Primary Examiner*—Christopher Upton
*Attorney, Agent, or Firm*—George A. Seaby

[57] ABSTRACT

The present invention relates to apparatus for oil spill recovery and more particularly, concerns a catamaran style sea-going vessel capable of lifting an oil spill or slick from the surface of the sea water, separating the oil from the sea water and storing the recovered oil temporarily for transfer to a larger vessel or storage facility. The apparatus utilizes a pair of contra-rotating drums for oil pick-up, the oil being directed to come into contact with the outer surface of the drums by a deflector extending between the hulls of the vessel.

5 Claims, 10 Drawing Sheets

OIL SPILL RECOVERY VESSEL

BACKGROUND OF THE INVENTION

This invention relates to methods and equipment for oil spill recovery and more particularly, it concerns a unique seagoing vessel capable of lifting an oil spill or slick from the surface of sea water, separating the oil from the sea water and storing the recovered oil temporarily for transfer to a larger vessel or storage facility in a highly efficient manner.

More particularly, the present invention is directed to improvements to the invention described in Canadian Patent 1,063,039, issued September 1979, to Petroclearance Ltd.

During the past decade, numerous efforts have been made to develop equipment and techniques for the containment and recovery of oil spills at sea resulting either from the collision of oil transporting ships or accidents in the drilling and operation of offshore wells. Although many significant technology developments have resulted from these efforts, the presently intense exploration for sources of petroleum products at remote points of the globe will obviously increase tonnage of petroleum products to be transported or handle at sea. The increased likelihood of oil spills attendant to these activities, therefore, creates a need for oil spill containment and recovery capabilities far in excess of the current state of the art. For example, the type of equipment most commonly used at the present time incorporates one or more oleophilic endless belts extending forwardly of a supporting barge which operate to lift an oil slick from the surface of sea water for transfer to a wringing device and storage in tanks on the barge. While such equipment has shown promise in calm water, it is not efficient in choppy water nor is a vessel capable of supporting such equipment sufficiently seaworthy for effective operation in unprotected waters. Also the speed at which this type of equipment can operate is limited by the high percentage of sea water picked up with the oil thus requiring frequent interruptions to empty the tanks of the recovery vessel. In addition, such equipment is prone to frequent breakdowns as a result of debris interfering with operating components of the system.

Another class of oil spill recovery equipment in current use employs a floating suction intake or weir by which oil floating on the surface of sea water is essential decanted and pumped to storage tanks. This type of equipment is both inefficient in choppy waters and is particularly vulnerable to breakdown due to debris entering the suction system. In another form of apparatus of this general type, an adjustable weir is provided at the base of the U-shaped vessel such that as the vessel is advanced through an oil spill, a wave of oil-water mixture builds up against the weir with the oil spilling over and water passing under the weir. Not only are large amounts of water picked up with the oil, thus reducing the efficiency of such equipment, but height adjustment of the weir to avoid interference by floating debris makes complete collection of the surface oil slick difficult. Also it will be appreciated that the use of such a device in other than calm water is accompanied by a significant reduction in efficiency due to a collection of large amounts of water which is tantamount to a significant reduction in collection efficiency.

These exemplary types of equipment in current use are by no means all inclusive of the various approaches that have been taken to the problems associated with oil spills. Experience with these types of devices, however, indicates a critical need for increased speeds of operation; capability for efficient operation in rough or choppy waters; capability for handling floating debris in the oil without potential damage to the equipment; increased efficiency in the separation of the floating oil slick from sea water to minimize energy requirements for fluid handling; increased oil storage capacity in the recovery vessel to avoid operating interruptions for the transfer of recovered oil to a storage vessel; and increase mobility from the standpoint of both transporting the recovery equipment to the site of the spill and from the standpoint of effective recovery operations at the spill site.

Broadly speaking, the invention disclosed in Canadian Patent 1,063,039 provides an oil spill recovery vessel comprising: a pair of transversely spaced apart elongated hulls each having a plurality of discrete internal chambers to defining buoyancy tanks and storage chambers; valves for opening the bottoms of the storage chambers to allow ingress and egress of liquid to and from the storage chambers; and a pair of drums for picking up a mixture of oil and water between the hulls and for introducing the mixture to the top of the storage chambers thereby to establish in the chambers a layer of oil superimposed above water until a sufficient quantity of oil has been introduced into the chambers to displace the water through the valves, the drums being counter-rotatable, and spaced apart longitudinally to establish a gap between the peripheries thereof, both of the drums being movable from an elevated inoperative position when the storage chambers are empty of liquid to a lower operative position so that the peripheries of both drums will be in contact with the surface of water in which the hulls are floated when the bottoms of the storage chambers are open, the space between the hulls being unobstructed except for the drums at and below the surface of the water.

In the operation of the prior art vessel, the vessel is first floated to the site of an oil spill in a light condition; that is, with the storage chamber valves closed and empty of ballast so that the storage chambers at this time also contribute to the buoyancy of the vessel. On reaching the spill, the storage chambers valves are opened to flood the storage chambers with sea water thereby increasing the draft of the vessel until the lower peripheral portion of the counter-rotating pick-up drums are submerged slightly beneath the surface of the oil slick. The vessel is then advanced through the oil slick with the drums rotating in opposite directions and such that tangential movement of the drum peripheries at the gap between them is upward. As a result of liquid adhesion to the drum peripheries in combination with the counter-rotating peripheral movement of the drums, oil or a mixture of oil and sea water is advanced over the top of each drum and directed to the flooded storage chambers by the aforementioned scavenger blades and trough-like ducting. Because of its low specific gravity, the oil delivered to the storage chambers will float on the sea water with which the storage chambers have been ballasted to a head slightly above the level of sea water on the hull exterior. As additional oil is fed to the upper portion of each of the storage chambers, however, it will displace sea water downwardly through the open valves in the bottom of these spaces or tanks. Accordingly, an effective separation of oil and sea water occurs within the storage chambers such that their capacity for retaining the recovered oil spill is maximized. Once the tanks are filled with oil, of course, the ballasting valves will be closed and the oil transferred to a larger capacity storage vessel.

SUMMARY OF THE INVENTION

The present invention, however, seeks to improve the apparatus heretofore described in a number of significant ways.

Firstly, to increase the effective separation of oil and sea water with the storage chambers baffles are provided in each storage chamber effectively dividing the area of each chamber into a number of interconnected chambers such that oil delivered to the storage chambers follows a torturous route through the system of baffles.

Secondly, structure has been devised which will substantially increase the recovery of oil by ensuring that the fluid, ie: the mixture of oil and water is recovered directly from the front of each contra-rotating drum and not from below the drums. With the system disclosed in Canadian Patent 1,063,039, a portion of the oil on surface could flow through the apparatus without contacting or even coming close to contacting the surface of each drum. Accordingly, the present invention provides for the placement of a plate or series of plates below the drums, the plates being configured such that the water and oil mix is caused to be directed upwardly to the drums. The plates are height adjustable.

Finally, again in order to improve the oil recovery, it has been found that by maximizing the pressure differential in the area between the bottom of the rotating drums and atmospheric pressure, a strong upward suction effect is created, thus ensuring maximum flow of oil/water to the drum surface. This is achieved by sealing the gap between the inner sides of the hulls and the ends of the transversely placed drums and directing the fluid drawn by the counter rotation of the drums upwardly towards the gap between the drums, and then setting the gap between the drums and the rpm of the drums at the optimum for the viscosity of the oil recovered.

This suction effect can be increased by localizing the volume of fluid presented to the drums by using the plate or series of plates previously mentioned. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIGS. 1 through 5 of the accompanying drawings and the description relating thereto form a substantial part of the prior art Canadian Patent 1,063,039 and are necessarily included within the body of this specification to assist in defining the inventive improvements thereover, consequently:

DESCRIPTION OF THE PREFERRED EMBODIMENTS

Figure 1:
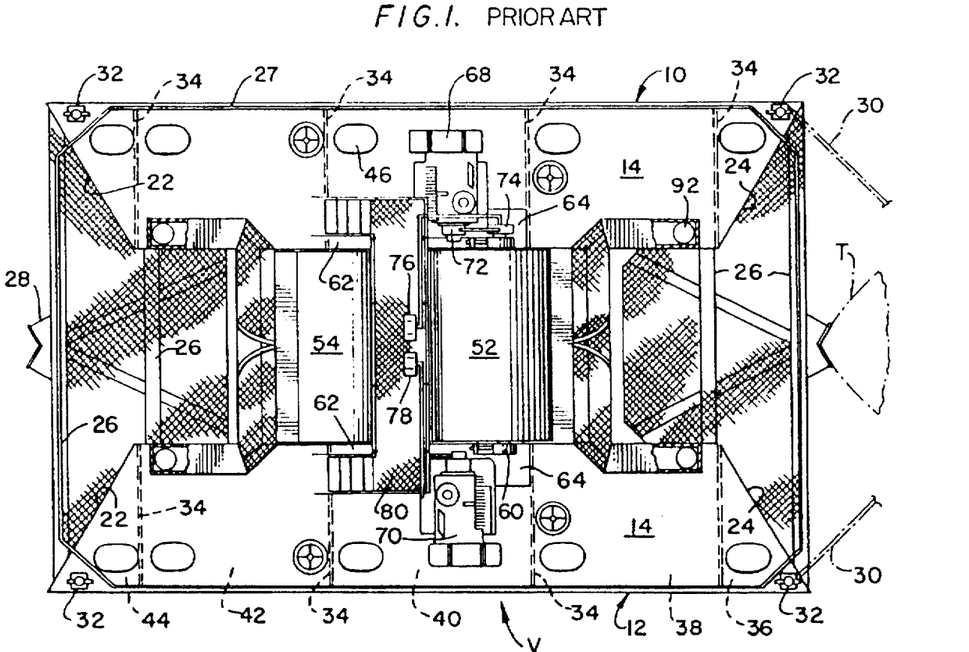
FIG. 1 is a plan view of the oil spill recovery and containment vessel of the present invention.
Figure 2:
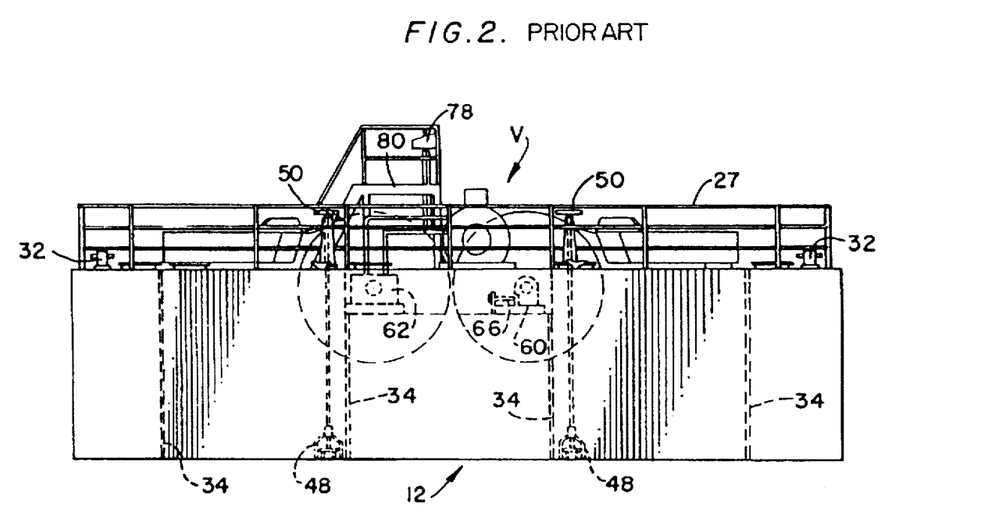
FIG. 2 is a side elevation of the vessel shown in FIG. 1.
Figure 3:
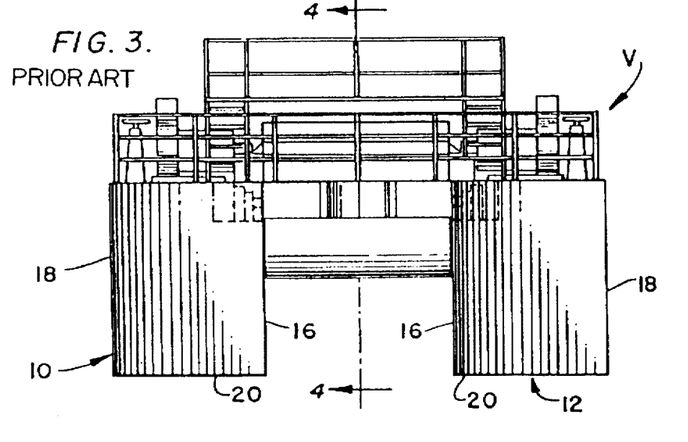
FIG. 3 is an end elevation of the vessel shown in FIGS. 1 and 2.

As shown in FIGS. 1–3 of the drawings, the oil spill recovery and retention vessel V of the present invention is in the nature of a catamaran having a pair of transversely spaced longitudinal hulls designated generally by the reference numerals 10 and 12, respectively. Each of the hulls is of generally rectangular cross-section to establish a deck-like top wall 14 and a flat bottom 20. As shown most clearly in FIG. 1, the longitudinal configuration of each of the hulls 10 and 12 is symmetrical about a transverse medial line and the opposite end walls 22 and 24 of each hull are defined by essentially planar vertical walls disposed at an angle of approximately 60 degrees with respect to the longitudinal center-line of the vessel. Although the aforementioned angle in itself is not critical, it will be noted that the direction of end wall inclination with respect to the vessel length is opposite in the two hulls 10 and 12 to defined a funnel-like or converging hull confirmation extending from the outboard side wall 18 to the inboard side wall 16 at opposite ends of the vessel. The vessel hull structure is physically integrated by a plurality of transverse beams 26 extending between and interconnecting the two hulls 10 and 12 near the upper portion of each. Conventional deck screening supported by the transverse beams 26 extends between the top walls 14 of the hulls to provide a working deck circumscribed by appropriate guard rails 27.

Figure 6:
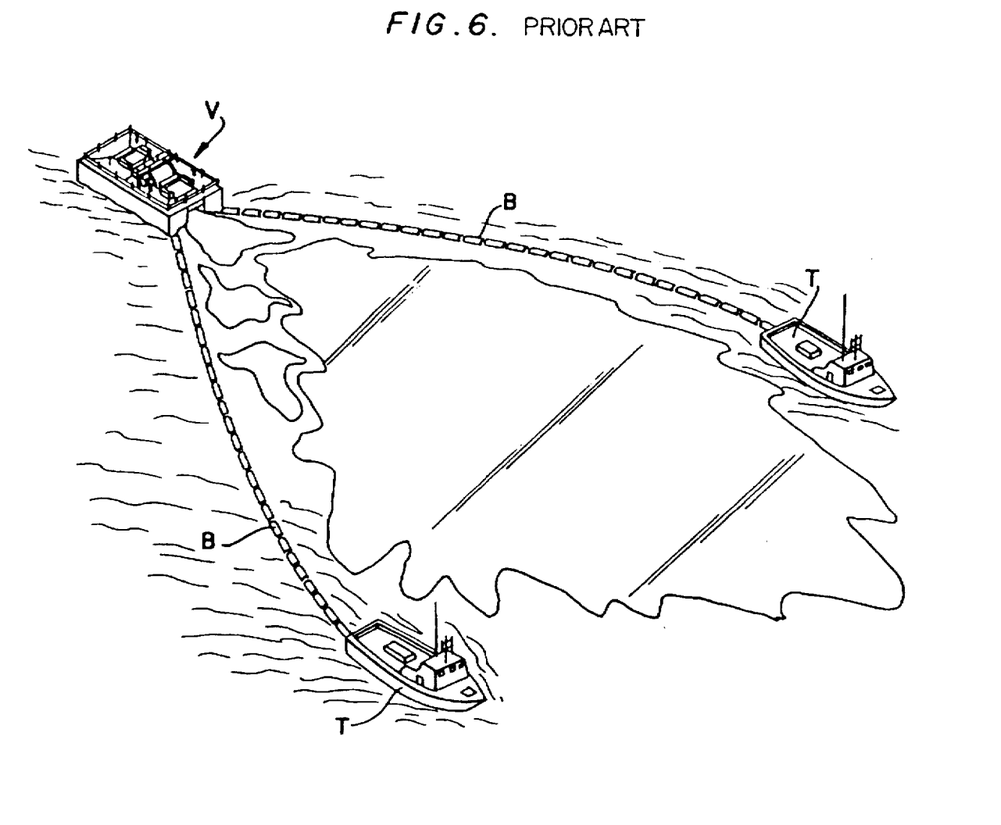
FIG. 6 is a perspective view showing one method of employing the vessel of the invention to recover an oil spills.

Although it is contemplated that the vessel may be equipped with its own source of marine propulsion and steering, the disclosed embodiment is in the nature of a barge or raft adapted to be advanced longitudinally by towing or pushing vessels such as conventional tug boats T (FIG. 6). To this end, the endmost of the transverse beams 26 at opposite ends of the vessel are fitted with V-shaped bumpers 2 to accommodate a pushing tug boat T for advancing the disclosed vessel in either direction. Steerage of the vessel when pushed by a single tug boat in this manner is effected by the tug boat steerage system by way of snubbing lines 30 extending from post bollards 32 at the extreme ends of each of the hulls 10 and 12. In some instances it may be desired to pull the vessel using one or more towing tug boats in which case the post bollards will facilitate this form of propulsion.

It will be appreciated that each of the hulls 10 and 12 can be constructed using conventional materials and assembly techniques to provide a substantially fluid tight enclosure of a strength commensurate with the requirements of sea-going hull structures. In accordance with an important feature of the present invention, however, it will be noted that each of the hulls 10 and 12 is divided longitudinally by transverse walls or bulk heads 34 (FIGS. 1 and 2) to establish in the disclosed embodiment five discrete fluid chambers 36, 38, 40, 42 and 44. Such chambers provide in each hulls alternating buoyancy tanks (36, 40 and 44) and storage chambers or tanks (38 and 42). Although each of the interior chambers is provided with a hatch closure 46 of sufficient size to enable access to the interior of each chamber, it will be noted that the storage chambers 38 and 42 are also provided with flooding or ballasting valves 48 in their bottom wall 20 and adapted to be actuated by appropriate means such as hand wheels 50 accessible at the deck of the vessel. The importance of this interior hull structure will become more apparent from the description to follow.

It is to be noted that while no provision is shown in the drawings for ballasting the buoyancy tanks 36, 4 0 and 44, it is contemplated that these tanks may be equipped with conventional ballast valves and pumps to enable controlled adjustment of vessel draft and freeboard. Such equipment is not essential to operation of the vessel or to practicing the invention, and has been omitted in the interest of clarity.

Figure 4:
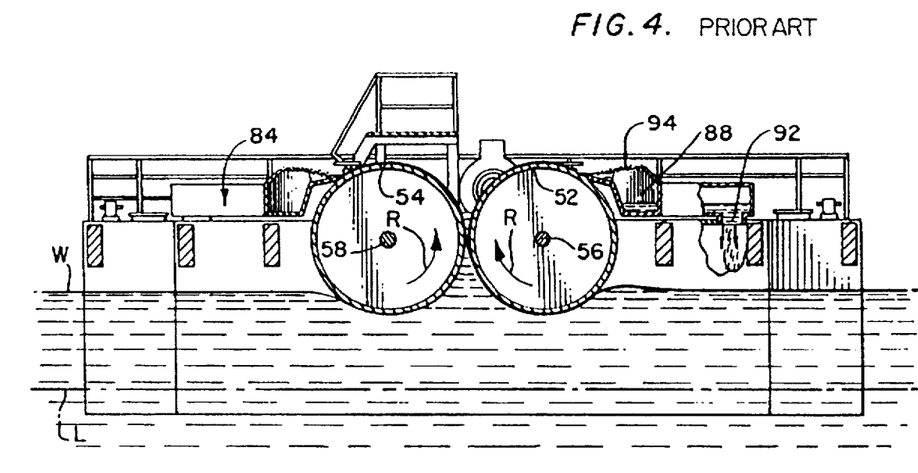
FIG. 4 is a longitudinal sectional view of the vessel taken on line 4—4 of FIG. 3.

As shown in the drawings, a pair of cylindrical drums 52 and 54 are carried by axles 56 and 58, respectively, the respective axles in turn being journalled at opposite ends in bearing blocks 60 and 62 positioned in deck wells 64 in each of the hulls 10 and 12 near the inboard walls 16 thereof. As shown in FIGS. 1 and 4, the cylindrical drums 52 and 54 span fully the space between the inboard walls 16 of the hulls and are of such a diameter that the lower peripheral edge of each drum is elevated substantially above the bottom 20 of the hulls 10 and 12. However, the bearing blocks 60, on which the drum 52 is rotatably supported, are adjustably positioned for fore and aft movement by adjustment of feed screws 66 (FIG. 2). In light of this organization of the bearing blocks 60, it will be appreciated that the gap between the periphery of the drums 52 and 54 may be varied from a position of contact with each other to a spacing of several inches.

Each of the drums 52 and 54 is adapted to the rotated independently of each other in the disclosed embodiment by internal combustion engines 68 and 70, respectively. Although the drive transmission by which the output of each of the internal combustion engines is only generally illustrated in the drawings, it is preferred that the transmission include a hydraulic pump 72 coupled directly to the output shaft of each of the internal combustion engines for supplying hydraulic fluid under pressure to a hydraulic motor 74 coupled by a spline connection (not shown) directly to the axles 60 and 62 of the respective drums. The transmission of motive force from the pump 72 to the motor 74 for each drum 52 and 54 is regulated by appropriate hydraulic control units 76 and 78. The control units are preferably positioned for access from a command bridge 80 extending between the hulls 10 and 12 and elevated above the drums 52 and 54. Although complete detail of the drive system for the drums 52 and 54 is not shown in the drawings, it will be appreciated by those skilled in the art that the speed and direction of rotation of the drum 52 may be controlled by manipulation of the control unit 76 whereas rotational direction and speed of the drum 54 may be controlled by manipulation of the control unit 78. Also, adjustable fore and aft movement of the drum 52 and its drive motor 74 may be accommodated very easily in the disclosed system by flexible hydraulic fluid conduits extending between the pump 72 and the motor 74.

Figure 5:
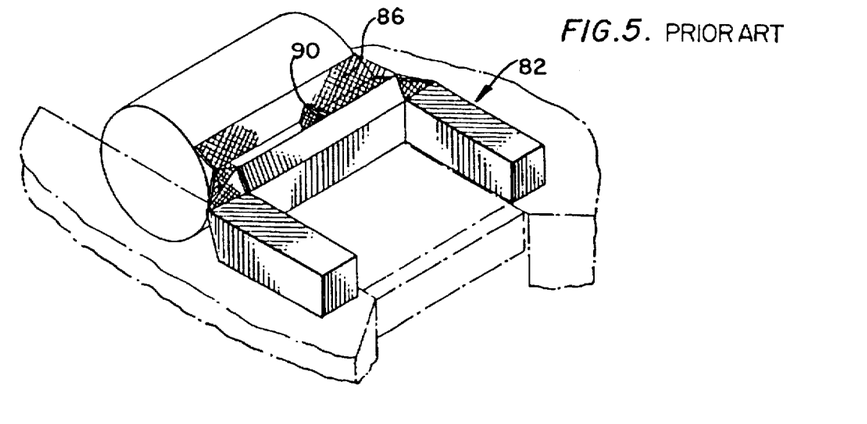
FIG. 5 is a fragmentary perspective view illustrating the oil scavenging and transfer ducting system incorporated in the vessel of the invention.

As shown most clearly in FIGS. 4 and 5 of the drawings, associated with each drum 52 and 54 is a scavenger or scraper blade and oil distribution trough assembly generally designated by the reference numerals 82 and 84. Each of the assemblies 82 and 84 is identically constructed to include an inclined scraper blade 86 extending the length of the associated drum 52, 54 and displaced from the point of the narrowest gap between the drums by approximately 120 degrees. This angular displacement or location of the blade 86 with respect to drum rotation enables liquid on the surface of each of the drums to flow by gravity along the inclined blade 86 and into a trough-like distributing duct 88 as shown most clearly in FIG. 4. To avoid the possibility of sparking, the blades are preferably formed or coated with a resinous material such as TEFLON (trademark) though other non-sparking materials such as aluminum may be used. The duct 88 is divided by a central baffle 90 and extends to an opening 92 through the top of each of the storage chambers 38 and 40 in the respective hulls 10 and 12. It is to be noted further that the openings 92 are located as remotely as possible from the flooding or ballasting valves 48 in the chambers 38 and 42. A coarse screening or grating 94 extending across the distribution trough 88 prevents the admission of debris to the tanks 38 and 42.

The operation of the vessel thus described may now be appreciated by reference to FIGS. 4 and 6 of the drawings. As shown in FIG. 4, the draft of the vessel V with the chambers 36, 38, 40, 42 and 44 empty of liquid is depicted by the line designated L in FIG. 4. Because of the low draft of the vessel in its "light condition", it is readily transported to the site of a spill without interference by the rotatable drums 52 and 54. Upon reaching the site of an oil spill, the valves 48 for of the storage chambers 38 and 42 in each of the hulls 10 and 12 are opened, allowing sea water to enter the storage chambers and to lower the hulls 10 and 12 to a working water line W. In this condition, the storage chambers 38 and 42 in each of the hulls will be filled with sea water to the level of the water line W.

With the valves 48 opened, the vessel is advanced longitudinally over the area of an oil spill with the drums 52 and 54 rotating in opposite directions as depicted by the arrows R in FIG. 4. As a result of such drum rotation, a mixture of oil and water is pumped upwardly through the gap between the drums and deposited in the respective distribution trough 88 for discharge to the top of the four storage chambers 38 and 42. Because the storage chambers are opened at their bottom and also because the specific gravity of the oil picked up is less than the sea water, water previously introduced to the storage chambers 38 and 42 will be displaced outwardly through the valves. Simultaneously the chambers 38 and 42 will operate in the manner of settling tanks so that water introduced with the oil through the openings 92 will settle out of the oil ultimately to be discharged through the open valves 48 as additional oil is introduced to the storage chambers.

The gap between the drums will vary with the conditions under which an oil slick is to be recovered. For example, if the oil slick contains a large amount of relatively heavy debris such as logs or the like, the gap between the drums will be increased to a maximum. Other types of debris such as sticks, cans, bottles and the like will have little effect on the operation of the vessel inasmuch as debris of this type will be crushed between the rotating drums and collected on the screening 94 for removal from the oil and water mixture passed to the cargo chambers. Because of the independent drive train for rotating the drums 52 and 54, the speed of rotation may be varied to optimize the recovery operation.

Figure 7:
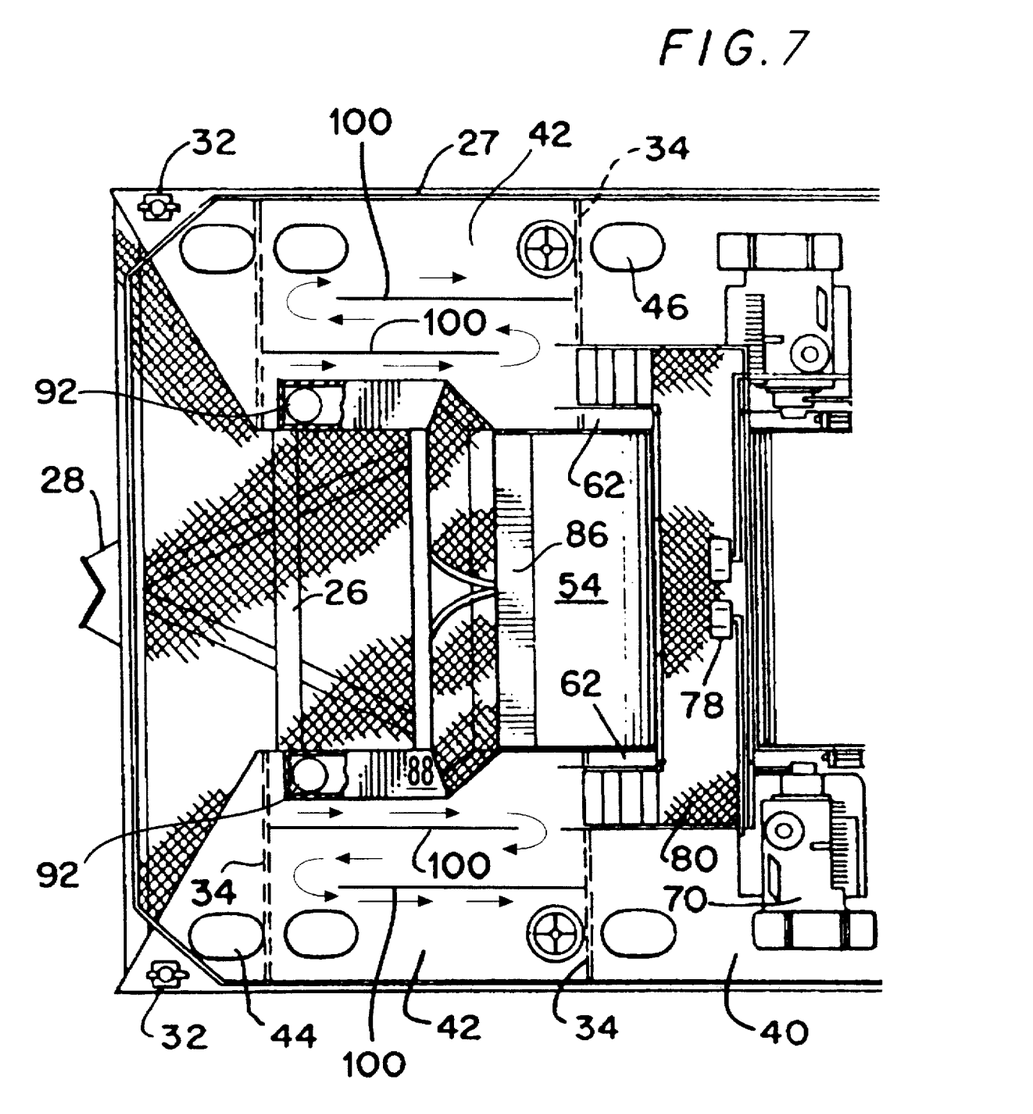
FIG. 7 is a plan view of one end of the oil spill recovery and containment vessel of the present invention including baffles in the storage chambers.

Looking now to the improvements contemplated by the present invention and with particular regard to FIG. 7, only one half of the system is shown. Drum 54 as described before in relation to FIGS. 4 and 5, is fitted with an inclined scraper blade 86 extending the length of drum 54. Liquid namely oil/water mix is removed from drum 54 by blade 86 into each trough or distribution duct 88 and thence through openings 92 into storage chamber 42. In each storage chamber 42 and 38, are provided baffles 100, in this embodiment, two such baffles are shown in each chamber 42 extending longitudinally from each transverse wall or bulkhead 34. Each baffle is fixed to the floor and to the bulkhead as by bolts or rivets, and the height of each baffle will be governed by the depth of the storage chamber, but will be less than the full height thereof. The oil/water mix will flow in the direction of the arrows. By providing this torturous path, more effective separation of the water and the oil will occur than with no baffles.

Figure 8:
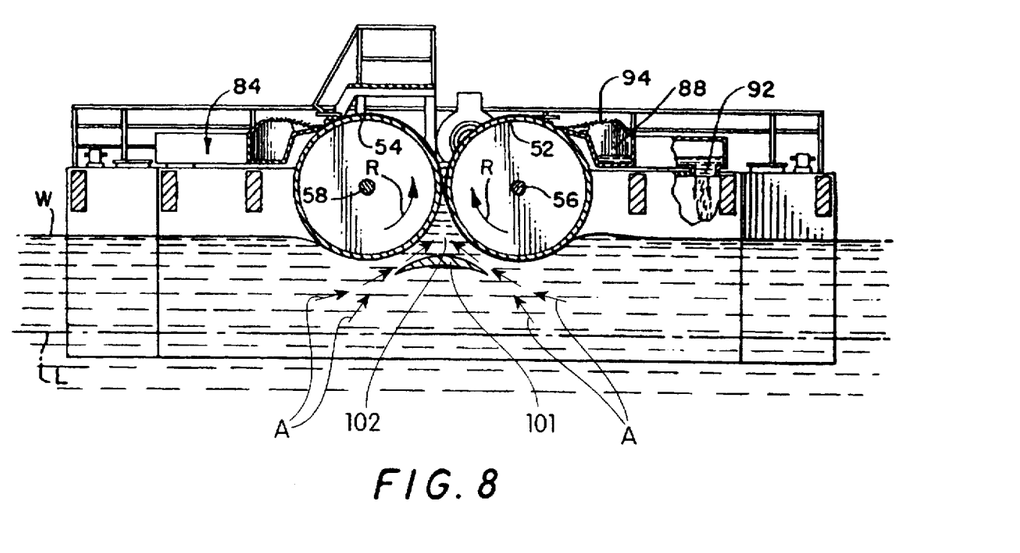
FIG. 8 is a longitudinal sectional view similar to FIG. 4 disclosing a first embodiment of a deflector according to the present invention.

Referring to FIG. 8, a further improvement or modification to the prior apparatus is shown, namely the provision of a deflector in the form of an arcuate plate 101, which is located central to and below the contra-rotating drums 52 and 54. The plate 101 is attached to and extends transversely between inboard walls 16 of the hulls 10 and 12. As will be seen and understood, plate 101 can be raised or lowered in relation to the rotating surface of the drums 52 and 54 and in relation to the depth of oil on the water surface, such that the oil/water flow is driven into the triangular space 102, in the direction as shown by the A, to be picked-up on the surface of the contra-rotating drums. No mechanism to facilitate the adjustment in height of plate 101 has been shown.

Figure 9:
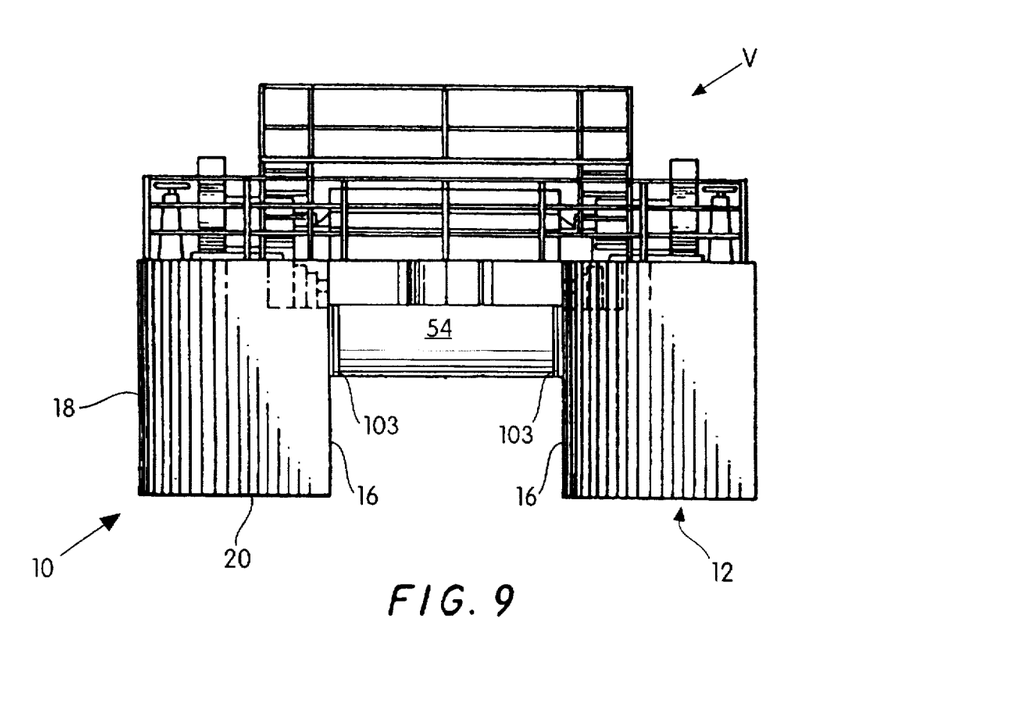
FIG. 9 is an end elevational view of the vessel of FIGS. 1 and 2 schematically showing the location and extent of a seal between the drums and the hull.

As will be appreciated, there is a gap between the ends of each drum 52 and 54 and the inboard wall 16 of hulls 10 and 12. This gap does allow some of the oil/water mixture to by-pass the drum surface. In order to effectively reduce this escape of oil, the present invention contemplates the addition of a seal 103 (FIG. 9).

Seal 103 is in the form of a layer of plastic applied to each end of drums 52 and 54 and to the surface of the inboard walls 16 of hulls 10 and 12. The composition of the plastic used is chosen to permit surface contact without affecting the rotation of the drums. The object, however, would be achieved, namely the sealing of that previously open space.

Figure 10:
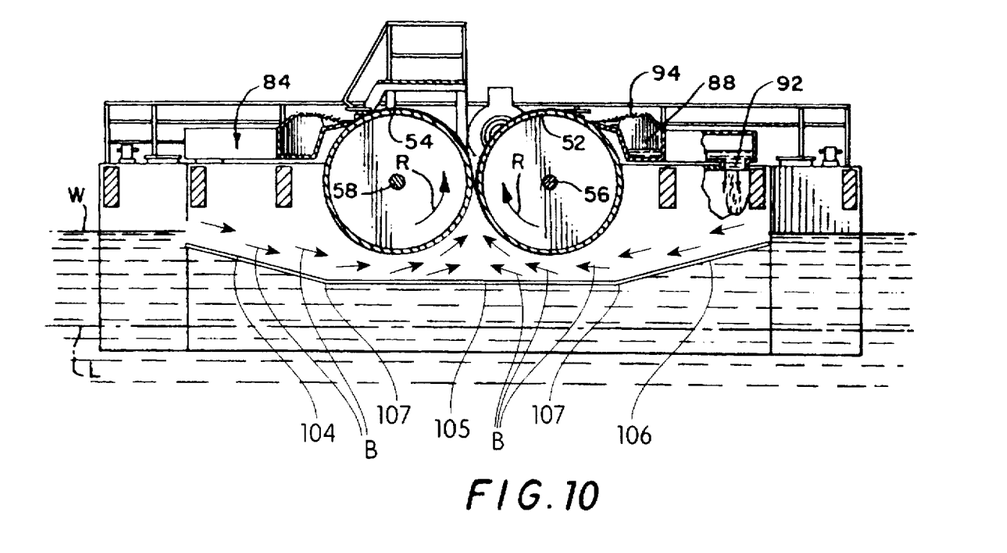
FIG. 10 is another longitudinal sectional view similar to FIG. 4 illustrating a second embodiment of the deflector according to the present invention.
Figure 11:
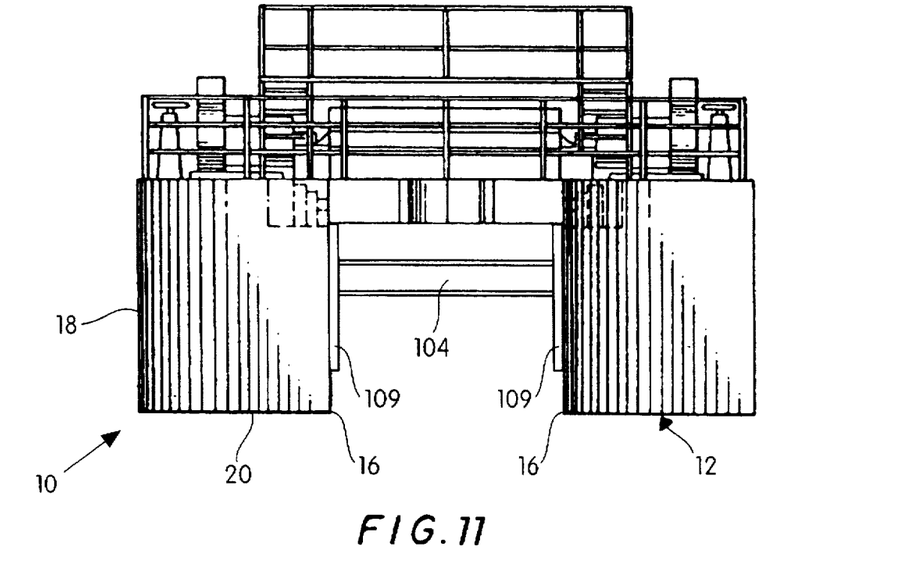
FIG. 11 is an end elevational view of the vessel of FIG. 10.

Shown schematically in FIGS. 10 and 11, and in more detail in FIGS. 12 through 17 is a further embodiment of the present invention. The deflector plate 101 of FIG. 8, has been replaced in this embodiment by a deflector defined by a hinged plate assembly comprising at least three plates 104, 105 and 106, pivotally interconnected by hinges 107. The three plates 104, 105 and 106, in a similar manner to plate 101 in FIG. 8 span the area between hulls 10 and 12 in the space below the hulls, and like plate 101, are utilized to direct or guide the flow of surface oil to the rotating drums 52 and 54. The direction of flow being shown schematically in FIG. 9.

In operation, it will be appreciated that it will be necessary to compensate for different depths of oil spills and hence differing working water levels.

Therefore, with both embodiments disclosed adjustments will be required as to the positions of plates 104 through 106 of FIGS. 10 to 18 and also the single plate 101 of FIG. 8 to allow for the depth below the surface of the oil/water mix. Therefore, with regard to FIGS. 9 and 12, there are a substantially stationary plate 105 and adjustable side plates 104 and 106. These side plates will regulate the amount of flow to the area 108 immediately adjacent the drums 54 and 57. As fluid is recovered from area 108, flow is created from each end causing a free flowing current in the direction of the arrows (FIG. 9) into area 108. As will be appreciated, this will permit surface oil to be recovered while the device is stationary.

The mechanism utilized to effect the height adjustment of plates 104 and 106, can take a variety of forms however, one specific arrangement is shown diagrammatically in FIGS. 11 through 18. In this embodiment, four hand operated mechanisms 109 are utilized, each mechanism comprising a central screw or threaded shaft 110 which is actuated by a hand wheel 111. The shaft 110 passes through a housing 111 and is attached by way of a universal joint 112 to a lower shaft 113, which itself is connected to a slotted angled plate 114. A plate 114 is attached to the upper surface of each of the plates 104 and 106. The bifurcated bottom of shaft 113 (FIG. 17) is connected to the plate 114 by a bolt 115 extending through a slot 116 and a nut 117. The bolt 115 is free to slide in the slot 116 as the height of the plate or the angle of the plate relative to the central plate 105 changes.

Figure 12:
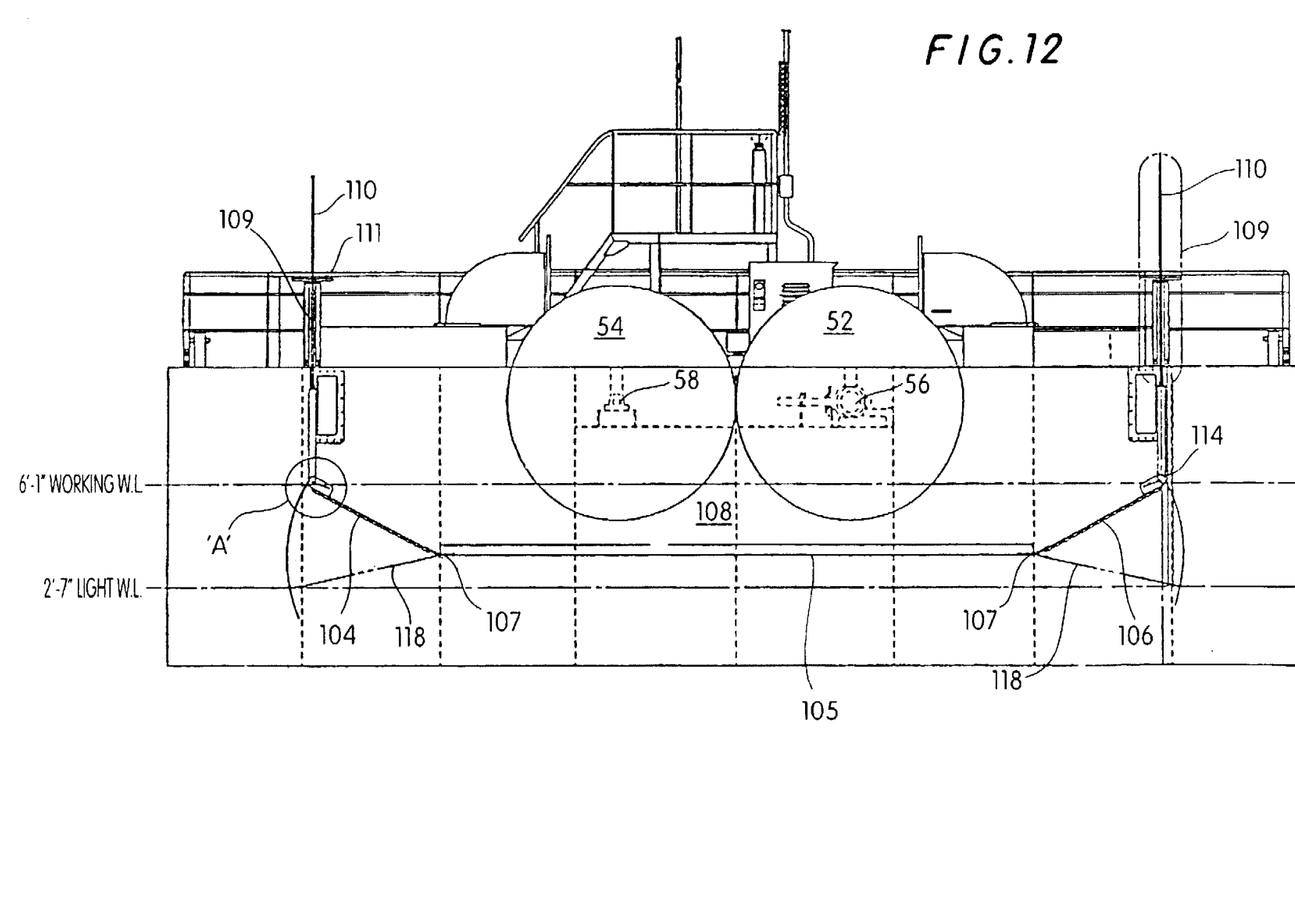
FIG. 12 is a more detailed longitudinal sectional view of the vessel of FIG. 10.
Figure 13:
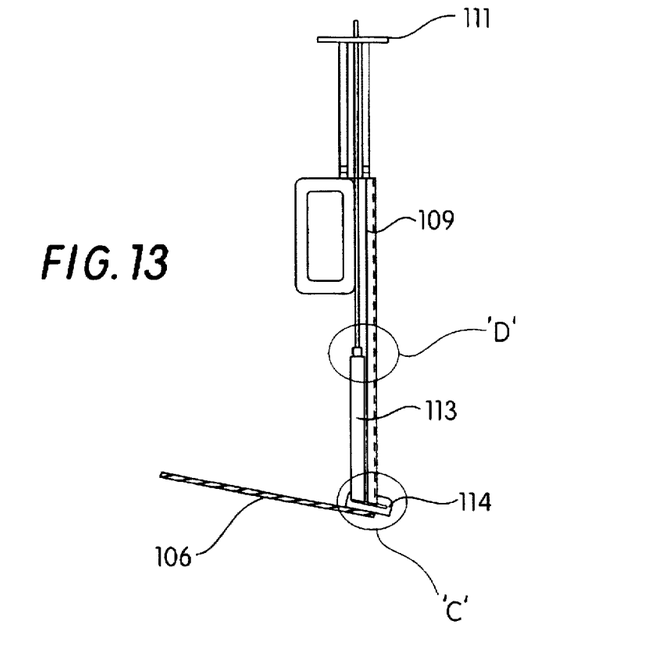
FIG. 13 is a schematic side view of a mechanism for adjusting the deflector of FIG. 12.
Figure 14:
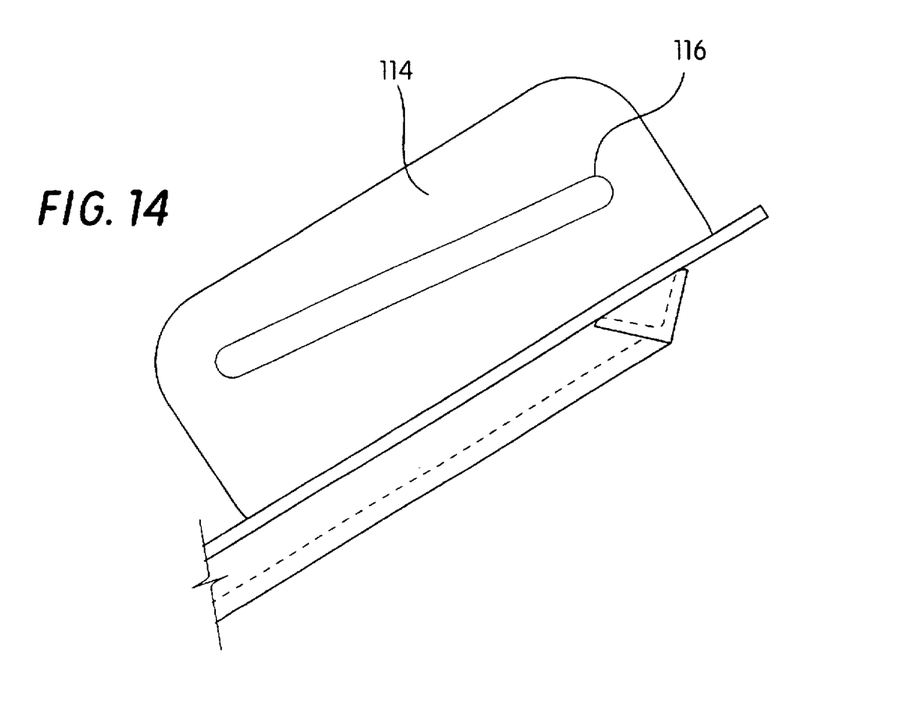
FIG. 14 is a detailed side elevational view of an adjustment plate according to detail 'A' of FIG. 12.
Figures 15, 16:
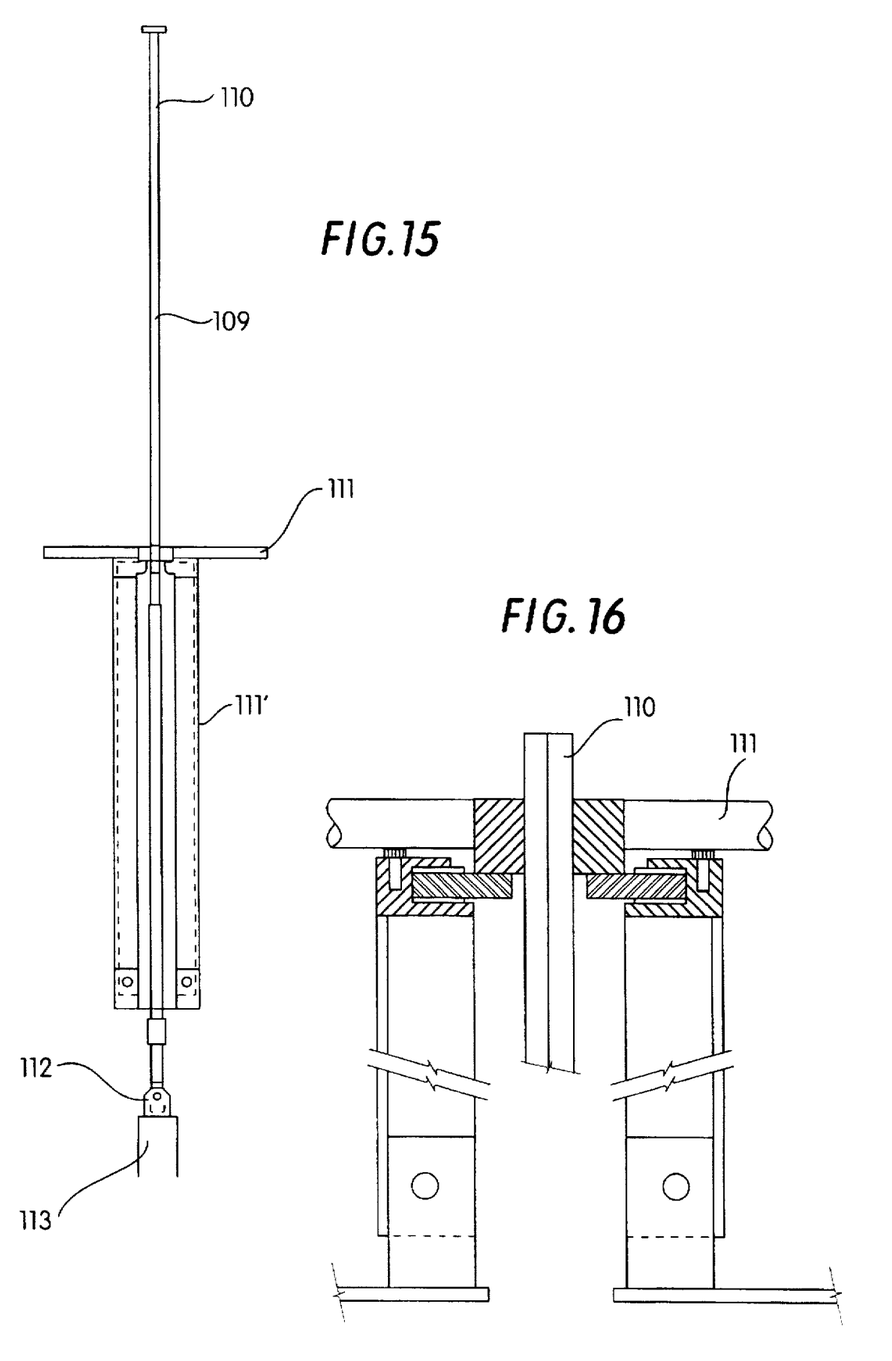
FIG. 15 is a side elevational view of a portion of a height adjusting mechanism for the deflector shown in FIG. 12.
FIG. 16 is a longitudinal sectional view of an upper portion of the mechanism of FIG. 15.
Figure 17:
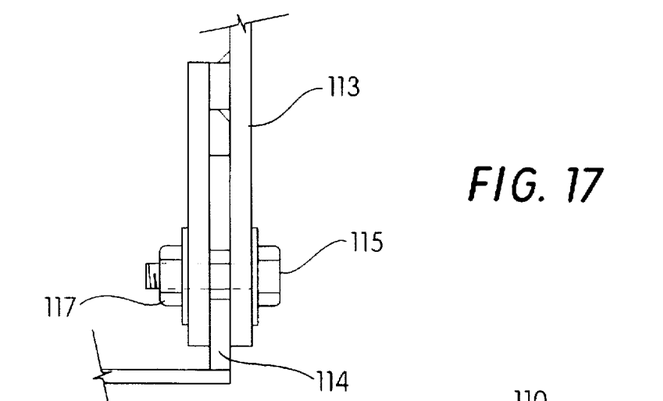
FIG. 17 is a side elevational view of a joint between deflector plates and the height adjustment mechanism (Detail 'C' of FIG. 13)
Figure 18:
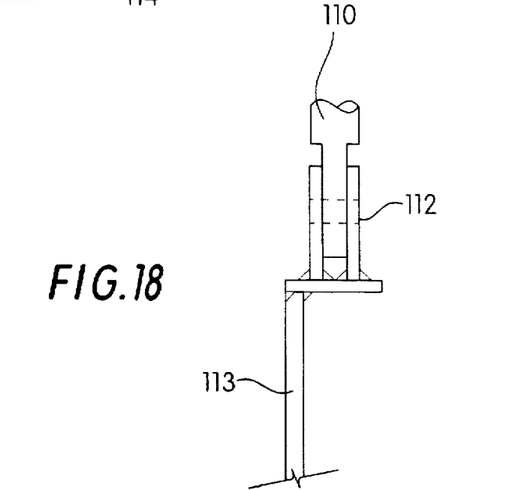
FIG. 18 is a side elevational view of a joint between elements of the height adjusting mechanism (Detail 'D' of FIG. 13)
Figure 19:
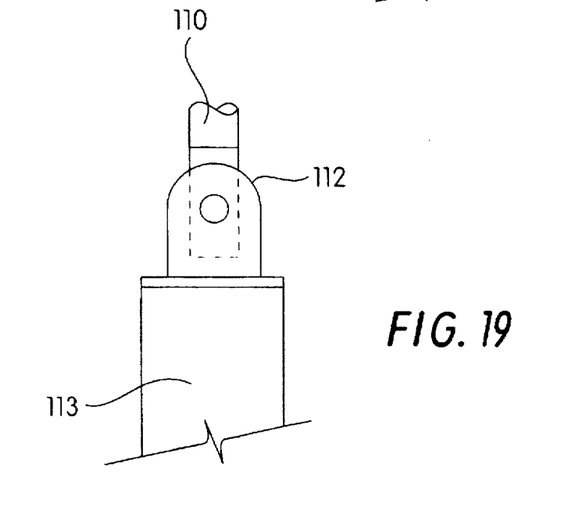
FIG. 19 is an end elevational view of the joint of FIG. 18.

Therefore, manual actuation of each separate mechanism, raises or lowers the outer edges of hinge plates 104 and 106 from an upper position as seen in FIG. 12, to its maximum lower position as shown in FIG. 13. This lower position is also indicated by broken line 118 of FIG. 12.

Each mechanism is mounted firmly on an adjacent bulkhead.

While manual actuation of each separate mechanism is contemplated, it will be appreciated that all units could be actuated simultaneously by means of hydraulics or electric motors. Additionally, other mechanism could be utilized to control the movement of each plate, for example, a cable and pulley system might be deemed an equivalent structure. Therefore, the form of mechanism shown here is purely exemplary and not in any way limiting.

A preferred technique for transversing a relatively small oil spill is shown in FIG. 6 of the drawings. The recovery vessel V is towed by a pair of tug boats T connected to one end of the recovery vessel by floating booms B. By advancing the recovery vessel slowly against wind and current, it is possible that the entire oil slick be recovered in one pass of the vessel.

Alternatively, and particularly in the case of larger oil spills, it may be desirable to circumscribe the oil spill first with a circular or closed boom to assure its containment with a defined area. The recovery vessel is maneuvered into the oil spill and then transversed back and forth until all of the oil has been recovered. The vessel of the invention is particularly suited to this type of operation because it can be operated in forward or reverse without loss of time for turning operations and without changing the direction of rotation of the drums since they continue to rotate in the same direction regardless of the direction of longitudinal movement of the vessel.

The vessel can also be used in situations where an oil spill has drifted under wharves and similar structures which are not accessible using the recovery vessel of the invention. In this situation, the vessel is placed against the structure under which the oil spill has spread and both of the drums 52 and 54 are initially rotated in the same direction to initiate a current of the spill between the two hulls 10 and 12. As the current becomes established, the direction of rotation of the drum which is downstream in relation to the current can be reversed to effect a pumping action similar to that described above with respect to FIG. 4 of the drawings.

Although the design of the oil spill recovery and storage vessel of the invention is adaptable to wide variations in sizes, the following exemplary dimensions are given to enable a complete understanding of the operating parameters of the vessel.

Length overall—40 ft. 0 in.
Beam overall—26 ft. 0 in.
Depth of hulls 10 and 12—10 ft. 0 in.
Width of each hull—8 ft. 0 in.
Draft (light)—2 ft. 3 in.
Draft (working)—5 ft. 0 in.
Drum diameter—8 ft. 0 in.
Drum length—10 ft. 0 in.
Axle height above working water line (W)—4 ft. 0 in.
Gap size—0 in. to 6 in.

Given a vessel of of the above dimensions, the approximate storage capacity of the four chambers 38 and 42 is approximately 50 short tons of oil having a specific gravity approximating 0.87.

As an example of the rate at which the vessel can recover an oil slick, if the drum gap in the above vessel is set to produce a surface film on each drum of approximately one-quarter of an inch in thickness and the drums are rotated at a speed of approximately 30 rpm, approximately 315 cubic feet of liquid will be picked up by the vessel per minute. While this represents a rate of approximately 10 short tons per minute, it is to be understood that a substantial percentage of the liquid picked up will be sea water particularly if complete collection of all oil is to be assured. A conservative estimated percentage of oil might be assumed to be 10%. At this rate, the storage chambers 38 and 40 will be filled in approximately 50 minutes to one hour. At this rate, a major oil spill of approximately 200 short tons can be recovered in approximately five to six hours. It is contemplated that because of its relative simplicity, the recover vessel of the present invention could be carried aboard large oil tankers as tenders for use in the event of oil spills even in the open sea. Smaller versions than the example given could be handled by life boat davits and lowered onto the sea for spill recovery. With large size tankers having a capacity of 300,000 short tons or more, it is possible that a vessel having the exemplary dimensions given above could be carried and readily handled by equipment available on the deck of such tankers.

Thus it will be appreciated that by the present invention there is provided an improved vessel and method for effective recovery and containment of oil spills. It also will be appreciated by those skilled in the art that various modifications and/or changes in the disclosed embodiment can be made without departure from the concept manifested by the disclosed embodiment. It is intended, therefore, that the foregoing description is illustrative of a preferred embodiment only, not limiting, and that the true spirit and scope of the present invention be determined by reference to the appended claims.

What we claim is:

1. An oil spill recovery vessel comprising:

a pair of spaced apart, elongated interconnected hulls, each hull having a plurality of discrete internal chambers defining buoyancy tanks and storage chambers;

valves in the bottoms of said storage chambers permitting the ingress and egress of liquid to and from said storage chambers for altering the buoyancy of the vessel;

a pair of drums extending transversely between said hulls, said drums being spaced apart a distance sufficient to define a narrow gap therebetween permitting the passage of oil and water through said gap;

a drive for contra-rotating said drums, whereby liquid is introduced into said storage tanks to cause the bottoms of said drums to contact the surface of a body of water, whereby oil and water are carried from the surface through the gap between the contra-rotating drums;

a scraper for removing oil from the surface of the drums;

a trough for receiving the oil from each drum and conveying the oil to the top of said storage chambers, the ingress of oil into said storage chambers displacing water therein downwardly through said valves;

a deflector extending transversely between said hulls beneath said drums for directing oil and water into the gap between said drums, the deflector being spaced vertically from the gap, and defining front and rear openings permitting the flow of liquid between the deflector and the drums longitudinally of the vessel, whereby the flow of liquid through the gap is expedited.

2. The oil spill recovery vessel of claim 1, wherein said deflector includes an arcuate plate extending transversely between said hulls and centered beneath the gap.

3. The oil spill recovery vessel of claim 1, wherein said deflector includes a plate assembly defined by a central plate and two end plates extending transversely between said hulls beneath said rollers, and hinges extending transversely of said hulls pivotally interconnecting said plates, whereby the angular relationship of at least one of said end plates with respect to said central plate can be adjusted.

4. The oil spill recovery vessel of claim 1, including seal means for sealing any space between the ends of each drum and an adjacent hull.

5. The oil spill recovery vessel of claim 1, including baffles in said storage chambers for promoting the separation of oil from water in the storage chambers.

* * * * *